United States Patent

Uraneck et al.

[15] 3,664,978

[45] May 23, 1972

[54] AGGLOMERATION OF FINE RUBBER PARTICLES

[72] Inventors: Carl A. Uraneck; John E. Burleigh, both of Bartlesville, Okla.

[73] Assignee: Phillips Petroleum Company

[22] Filed: June 22, 1970

[21] Appl. No.: 48,430

[52] U.S. Cl. ............... 260/5, 260/29.7 PT, 260/33.6 AQ, 260/34.2, 260/41.5 MP, 260/94.7 R, 260/746, 260/761, 260/763, 260/821

[51] Int. Cl. .................................................. C08c 9/08

[58] Field of Search ............. 260/29.7 PT, 33.6 AQ, 34.2, 260/41.5 MP, 821, 94.7 S, 94.7 R, 41.5 R, 5, 746, 761, 763

[56] References Cited

UNITED STATES PATENTS

| | | | |
|---|---|---|---|
| 3,079,360 | 2/1963 | Sutherland et al. | 260/41.5 MP |
| 2,979,481 | 4/1961 | Hanmer | 260/41.5 |
| 3,131,160 | 4/1964 | Alexander et al. | 260/33.6 |
| 3,092,603 | 6/1963 | Gauslaa et al. | 260/33.6 |
| 3,290,268 | 12/1966 | Scofield | 260/41.5 |
| 3,449,284 | 6/1969 | Pollock | 260/29.7 |

OTHER PUBLICATIONS

Carrol et al. in Kraus– Reinforcement of Elastomers (Interscience) (N.Y.) (1965), pages 307– 317 TS 1925 K7.

*Primary Examiner*—Allan Lieberman
*Assistant Examiner*—H. H. Fletcher
*Attorney*—Young and Quigg

[57] ABSTRACT

Latex is added to a suspension of solid particles comprising rubber in an aqueous medium to agglomerate the fine particles which are present.

10 Claims, No Drawings

AGGLOMERATION OF FINE RUBBER PARTICLES

This invention relates to a process for agglomerating fine particles. In one aspect the invention relates to the production of oil-rubber, oil-carbon black-rubber, and carbon black-rubber masterbatches. In another aspect, the invention relates to a process for producing such masterbatches wherein the losses resulting from fines are reduced.

In the production of oil-rubber, Oil-carbon black-rubber, or carbon black-rubber masterbatches, an appreciable amount of the product is lost to the process in the form of fine particles. A conventional operation in preparing such masterbatches involves separating the coagulated polymer, or coagulum, from the serum, which is then usually discarded, and then washing the polymer-containing solids with water in a reslurry zone. After separation from the water, the polymer containing solids can be conveniently dried in an extrusion drier. The water separated from the polymer containing solids and a stream recovered from the extrusion drier feed section are recycled to the reslurry zone. As both of these recycle streams contain polymer in the form of fine particles, also called fines, an accumulation of fines in the reslurry zone results, rendering unsatisfactory the feed of the extrusion drier.

It is an object of this invention to provide a process for agglomerating the fine particles elastomer-carbon black, elastomer-oil, or elastomer-oil-carbon black for their ultimate recovery.

Another object of this invention is to provide a process for the production of masterbatches wherein loss resulting from fines is reduced to a minimum.

Other aspects, objects, and advantages of the present invention will become apparent from a study of the disclosure and the appended claims.

In the rubber industry it is well-known to prepare oil-rubber, rubber-carbon black, and oil-carbon black-rubber masterbatches by a latex masterbatching operation. The preparation of such masterbatches involves blending an oil emulsion, a carbon black slurry, or an oil emulsion and carbon black slurry with a rubber latex after which the polymer is coagulated. The oil emulsion and latex mixture and the oil emulsion and carbon black slurry latex mixture are in the trade known, respectively, by the terms "oilex" and "carbex." While the invention will be discussed hereinafter with relation to oil extended rubber, it is to be understood that it applies broadly to latex containing compositions, e.g., carbon black-rubber, carbon black-oil-rubber, and oil-rubber compositions. In the usual operating procedure, the oilex is first passed into a coagulation tank where a coagulant such as brine-acid, is added after which it is transferred to a soap conversion zone. In the soap conversion zone, sufficient time is allowed for the conversion of the soap to acid. It is, of course, within the scope of the invention to use any suitable coagulation system. The mixture is passed from the soap conversion zone to a shaker screen where rubber crumb containing oil is separated from the serum. The serum, which contains some fines is usually discarded although it may be recycled to the coagulation zone. Rubber crumb remaining on the shaker screen is passed to a reslurry zone wherein it is washed with water. The crumb is then separated from the water, the water containing fines being usually discarded while the crumb is passed to a drying zone. When using an extrusion drier in the drying operation, a stream containing fines is recovered from the extrusion feed section. If this stream is recycled to the reslurry zone, fines accumulate therein, resulting in an unsatisfactory feed for the extrusion drier. In accordance with the present invention, a method is provided which makes it possible to recover as useful product the fines which in conventional masterbatching operations must be discarded as waste.

The present invention resides in a process for agglomerating fine particles of elastomer-oil, elastomer-oil-carbon black, or elastomer-carbon black. Broadly speaking the process comprises the steps of adding a latex of a rubbery polymer to the partially or completely coagulated mixture resulting from the admixture of oil, carbon black, oil and carbon black, with a latex of a rubbery polymer so as to agglomerate the fines therein. In a masterbatching operation, agglomeration of the fines makes it possible to recover them as a part of the product of the process.

In an exemplary operation, a mixture of latex of a rubbery polymer and oil emulsion is supplied to a coagulation tank. A coagulant is introduced into the tank. With a mixture of latex and oil emulsion it is preferred to use dilute sulfuric acid and dilute brine as the coagulant. Dilute sulfuric acid and glue are desirable as the coagulants when processing a mixture of latex, carbon black, and oil. The effluent from the coagulation tank is passed to a soap conversion tank. The coagulation tank and soap conversion tank are each provided with suitable stirring means. The mixture remains in the soap conversion tank for a time sufficient for the conversion of the soap to acid. Soap suitable for use in the emulsion polymerization process includes the alkali metal or ammonium stearates, oleates, rosinates, and the like. It is to be understood also that other emulsifiers such as alkali metal aralkyl sulfonates, aryl sulfonates, sodium lignin sulfonates, mercaptan ethylene oxide condensation products, phenol ethylene oxide condensation products, and the like can be used. Mixtures of emulsifiers are also frequently employed. As the emulsifier of mixture thereof is varied, it is in some instances necessary to vary the coagulation system. For example, alcohols are utilized as coagulation agents in some cases.

From the soap conversion tank the mixture of oil-containing rubber crumb and liquid is passed to a vibrating shaker screen. Liquid separated from the rubber crumb is recovered. This liquid or serum contains fine particles, and in the usual plant operation the liquid is usually discarded.

By the method of this invention, however, a volume of latex of a rubbery polymer is added to the mixture of rubber particles and serum for agglomerating the fines and preventing waste. The amount of solids of the additional latex is in the range of about 0.5–5 weight percent of the total solids in the original latex of the mixture and is added to the mixture only after at least 50 percent of the total coagulant necessary to effect substantially complete coagulation has been added. If less than 0.5 weight percent of the latex (based on solids) is added an insufficient amount of fines will be agglomerated and adding greater than 5 weight percent of latex (as solids) results in waste of materials. The added latex can be either natural or synthetic latex but is preferably of the same type of latex as the latex of the mixture in order that the resultant products are of uniform composition. It is preferred that the latex be added subsequent to the addition of substantially all of the coagulant to the mixture.

Alternatively, the fines in the serum or any wash water, which have been separated from the coagulated rubbery mixture, can be agglomerated and recovered by addition of a small quantity of latex to this serum.

According to this embodiment, in the range of 0.1–0.5 weight percent of additional latex solids are employed based on the weight of the fines present in the serum or wash water.

The presence of a large quantity of fines renders the feed to the extrusion drier unsatisfactory with the result that in the usual operation it becomes necessary to discard at least part of the recycle stream in order to maintain a proper level of fines concentration. In accordance with the present invention, a method is provided whereby the fines are agglomerated, thereby providing crumb of a size suitable as a feed for the extrusion drier.

EXAMPLE 1

An oilex mixture was prepared by the procedure as follows: A total of 1,200 g of natural rubber latex from Malaysia having an ammonia content of 0.7 weight percent based on the weight of the entire latex which was opaque white, very creamy, and free of prefloc, and which had about 60 percent solids by weight was diluted with 900 ml of deionized water. The diluted latex had 732 g of rubber solids present. A mixture comprised of 13.2 g of tri(nonylphenyl)phosphite, 3.38 g of oleic acid, and 146.4 g of Sunthene 380 oil (a trademark of the Sun Oil Company, Philadelphia, Pennsylvania, 19103, for a naphthenic rubber extender oil having a viscosity of 760 SUS at 100° F) was rapidly blended with the latex at a rate such that the latex absorbed the oil.

Carbon black dispersions were prepared thus. A high speed blender was employed to blend for 5 minutes a total of 2,240.5 g of deionized water, 3.5 g of Tamol 731 (a trademark for a sodium salt of a copolymer of diisobutylene and maleic anhydride; and 110 g of Philblack N—220 (a trademark for an intermediate super abrasion furnace black having a normal structure and fine particle size which can be obtained from the Phillips Petroleum Company of Bartlesville, Oklahoma).

A total of 357 g of the carbon black dispersion was blended with 86 g of the oilex mixture, and a mixture comprised of 2 g of $CaCl_2$ in 112 ml of deionized water was blended therewith. The mixture was then added to vigorously stirred hot (70° C) coagulant mixture comprised of 2.5 ml of concentrated sulfuric acid in 2 liters of water.

A portion of the resulting coagulated mixture was filtered through cheese cloth. A great amount of fines went through with the serum.

The run of this example is a control run which demonstrates the usual problem of production of fines according to prior art procedure.

EXAMPLE 2

One ml of the natural rubber latex of Example 1 containing 60 percent solids was diluted to a total volume of 100 ml with deionized water. When 20 ml of the diluted latex had been added to 1,200 ml of the coagulated mixture of Example 1 with stirring subsequent to coagulation significant agglomeration of fines had been effected. Thereupon, the coagulated mixture was filtered through cheese cloth. The crumb was readily filtered from the serum without plugging or clogging of the filter. Fines had been agglomerated and did not pass through the filter.

This example demonstrates that addition of a natural rubber latex to a coagulated mixture effects agglomeration of fines according to this invention.

EXAMPLE 3

Two ml of the oilex mixture prepared in Example 1 was diluted to a total volume of 100 ml with deionized water. When about 9 ml of the diluted oilex had been added to 800 ml of the coagulation mixture of Example 1 with stirring and subsequent to coagulation significant agglomeration of fines had been effected. Thereupon, the coagulated mixture was filtered through cheese cloth. The crumb was readily filtered from the serum without plugging or clogging of the filter. Fines had been agglomerated and did not pass through the cheese cloth filter.

This example demonstrates that latex within an oilex mixture is effective to induce agglomeration of fines when added to a coagulated mixture according to this invention.

EXAMPLE 4

Three ml of a SBR—1500 latex (ASTM—1419—61T) having a 20 percent solids content was diluted to 100 ml total volume with deionized water. When about 20 ml of the diluted latex mixture had been added to 500 ml of the coagulated mixture of Example 1 with stirring significant agglomeration of fines had been effected. Thereupon, the coagulated mixture was filtered through cheese cloth. The crumb was filtered from the serum without loss of fines. However, some plugging of the cheese cloth filter was noted.

This example demonstrates that a synthetic styrene-butadiene latex is effective to agglomerate fines according to the invention.

Other modifications and alterations of this invention will become apparent to those skilled in the art from the foregoing discussion and example and it should be understood that this invention is not to be unduly limited thereto.

What is claimed is:

1. A method for agglomerating fine particles, comprising:
   adding to a first latex at least 50 percent of the minimum volume of a coagulant required to effect substantially complete coagulation to the first latex for forming a mixture having fine particles therein; and
   thereafter adding a second latex of a rubbery polymer to the mixture, said second latex having a solids content in the range of about 0.5–5 weight percent of the latex solids of the mixture.

2. A method, as set forth in claim 1, wherein the second latex is of the same type as the first latex.

3. A method, as set forth in claim 1, wherein the first latex has an oil emulsion mixed therewith.

4. A method, as set forth in claim 1, wherein the first latex has carbon black mixed therewith.

5. A method, as set forth in claim 1, wherein the first latex has an oil emulsion and carbon black mixed therewith.

6. A method, as set forth in claim 1, wherein the entire volume of coagulant that is needed to effect substantially complete coagulation is added to the first latex to form the mixture.

7. A method, as set forth in claim 6, further including the intermediate step of passing the mixture through apertures for separating crumb resulting from the addition of coagulant and thereafter adding to the filtered mixture the second latex.

8. A method, as set forth in claim 7, wherein the first latex has an oil emulsion mixed therewith.

9. A method, as set forth in claim 7, wherein the first latex has carbon black mixed therewith.

10. A method, as set forth in claim 7, wherein the first mixture includes oil emulsions and carbon black.

* * * * *